United States Patent
Amhamed et al.

(10) Patent No.: US 11,446,603 B2
(45) Date of Patent: Sep. 20, 2022

(54) ACID GAS REMOVAL SYSTEM FOR REMOVING ACIDIC GASES FROM GASEOUS HYDROCARBONS

(71) Applicant: QATAR FOUNDATION FOR EDUCATION, SCIENCE AND COMMUNITY DEVELOPMENT, Doha (QA)

(72) Inventors: Abdulkarem Ibrahim Amhamed, Doha (QA); Ahmed Mohamed Gamal Abotaleb, Doha (QA)

(73) Assignee: QATAR FOUNDATION FOR EDUCATION, SCIENCE, ANDCOMMUNITY DEVELOPMENT, Doha (QA)

( * ) Notice: Subject to any disclaimer, the term of this patent is extended or adjusted under 35 U.S.C. 154(b) by 318 days.

(21) Appl. No.: 16/629,031

(22) PCT Filed: Jul. 6, 2018

(86) PCT No.: PCT/US2018/040971
§ 371 (c)(1),
(2) Date: Jan. 6, 2020

(87) PCT Pub. No.: WO2019/010344
PCT Pub. Date: Jan. 10, 2019

(65) Prior Publication Data
US 2020/0171423 A1 Jun. 4, 2020

Related U.S. Application Data

(60) Provisional application No. 62/529,369, filed on Jul. 6, 2017.

(51) Int. Cl.
*B01D 53/14* (2006.01)
*B01D 53/64* (2006.01)
(Continued)

(52) U.S. Cl.
CPC ..... *B01D 53/1462* (2013.01); *B01D 19/0015* (2013.01); *B01D 53/1425* (2013.01);
(Continued)

(58) Field of Classification Search
CPC ...... B01D 19/0015; B01D 2252/20405; B01D 2252/2041; B01D 2252/20426;
(Continued)

(56) References Cited

U.S. PATENT DOCUMENTS 4,568,364 A * 2/1986 Galstaun ................ B01D 53/14
95/236
5,209,914 A 5/1993 Peytavy et al.
(Continued)

FOREIGN PATENT DOCUMENTS

CA 2528205 A1 12/2004
KR 100889597 B1 3/2009
(Continued)

OTHER PUBLICATIONS

Mackenzie et al., "Design & operation of a selective sweetening plant using MDEA", Energy Progress (1987), 7.1.
(Continued)

*Primary Examiner* — Frank M Lawrence, Jr.
(74) *Attorney, Agent, or Firm* — Nath, Goldberg & Meyer; Richard C. Litman

(57) ABSTRACT

The acid gas removal system for removing acidic gases from gaseous hydrocarbons (10) removes sour gases, such as hydrogen sulfide ($H_2S$) and carbon dioxide ($CO_2$), from an input gaseous stream. The system (10) includes a contactor (12) for contacting the input gaseous stream with an absorption liquid solvent (ALS), and a stripper (24) for recycling the absorption liquid solvent (ALS) and removing acidic gases (AG) therefrom, but with the addition of a pair of plate-plate heat exchangers (22, 26). The first heat
(Continued)

exchanger (22) heats the used absorption liquid solvent (UALS) output from the contactor (12) prior to injection into the stripper (24). The used absorption liquid solvent (UALS) is heated via heat exchange with the acidic gases (AG) output from the stripper (24). The second heat exchanger (26) cools the recycled absorption liquid solvent (RALS) before injection back into the contactor (12).

9 Claims, 4 Drawing Sheets

(51) Int. Cl.
*B01D 19/00* (2006.01)
*C10L 3/10* (2006.01)

(52) U.S. Cl.
CPC .......... *B01D 53/1493* (2013.01); *C10L 3/102* (2013.01); *C10L 3/103* (2013.01); *C10L 3/104* (2013.01); *B01D 2252/20405* (2013.01); *B01D 2252/20431* (2013.01); *B01D 2252/20447* (2013.01); *B01D 2252/20489* (2013.01); *B01D 2252/504* (2013.01); *C10L 2290/06* (2013.01); *C10L 2290/10* (2013.01); *C10L 2290/12* (2013.01); *C10L 2290/148* (2013.01); *C10L 2290/541* (2013.01)

(58) Field of Classification Search
CPC .......... B01D 2252/20431; B01D 2252/20447; B01D 2252/20489; B01D 2252/504; B01D 2259/65; B01D 53/1425; B01D 53/1462; B01D 53/1493; C10L 2290/06; C10L 2290/10; C10L 2290/12; C10L 2290/148; C10L 2290/541; C10L 3/102; C10L 3/103; C10L 3/104
USPC .......... 95/159, 165, 166, 168, 169, 235, 236; 96/243; 423/220, 228, 229; 585/833
See application file for complete search history.

(56) References Cited

U.S. PATENT DOCUMENTS

| | | | |
|---|---|---|---|
| 6,423,282 B1* | 7/2002 | Araki | B01D 53/1456 423/210 |
| 7,938,887 B2 | 5/2011 | Rochelle et al. | |
| 8,765,951 B2 | 7/2014 | Blair et al. | |
| 8,899,557 B2 | 12/2014 | Cullinane et al. | |
| 9,586,175 B2 | 3/2017 | Idem et al. | |
| 2007/0053817 A1* | 3/2007 | Iijima | B01D 53/1425 423/220 |
| 2007/0221065 A1* | 9/2007 | Aroonwilas | B01D 53/14 96/243 |
| 2010/0229723 A1* | 9/2010 | Gelowitz | B01D 53/1425 95/162 |
| 2011/0168019 A1 | 7/2011 | Northrop et al. | |
| 2015/0352463 A1 | 12/2015 | Grave et al. | |
| 2016/0310894 A1* | 10/2016 | Tanaka | B01D 53/1425 |
| 2017/0001142 A1 | 1/2017 | Rayner et al. | |
| 2018/0056231 A1* | 3/2018 | Van Wagensveld et al. | B01D 53/1462 |

FOREIGN PATENT DOCUMENTS

| | | |
|---|---|---|
| KR | 1020100094428 A | 8/2010 |
| KR | 1020140038263 A | 3/2014 |
| KR | 101422670 B1 | 7/2014 |
| KR | 101536153 B1 | 11/2015 |
| WO | 2010036436 A1 | 4/2010 |

OTHER PUBLICATIONS

Younas et al., "Parametric sensitivity analysis on a GASCO's acid gas removal plant using ProMax simulator", Journal of Natural Gas Science and Engineering (2014), vol. 18, pp. 247-253.

* cited by examiner

ACID GAS REMOVAL SYSTEM FOR REMOVING ACIDIC GASES FROM GASEOUS HYDROCARBONS

TECHNICAL FIELD

The disclosure of the present patent application relates generally to the treatment of hydrocarbon gases, and particularly to a system for the removal of acidic, or "sour", gases from hydrocarbon feeds.

BACKGROUND ART

Hydrocarbon gases, such as natural gas, are often extracted from natural gas deposits or reservoirs containing additional acid, or "sour", gas components, such as hydrogen sulfide ($H_2S$) and carbon dioxide ($CO_2$). FIG. 2 illustrates a conventional prior art acid gas removal system 100 for treating a feed gas stream (such as a natural gas stream) in order to remove the acid gas components. System 100 includes a contactor 112 for receiving a feed gas and an absorption liquid solvent. Typical absorption liquid solvents include amines, such as monoethanolamine (MEA). As shown, the acidic, or "sour", feed gas may first be fed to a knock out drum 130, where heavy hydrocarbons, droplets of water, slugs and solids are precipitated out and may be removed through valve 132. The absorption liquid solvent contacts the gaseous stream of feed gas within the contactor 12 to remove acidic gases therefrom. A treated gas stream is output from the contactor 112, and a volume of used absorption liquid solvent (a "rich" amine) is output from the contactor 112.

An interchanger 122 is in fluid communication with the contactor 112 for receiving the volume of used absorption liquid solvent. The interchanger 122 heats the volume of used absorption liquid solvent to output a volume of heated solvent, which is fed to a stripper 124. Flow of the heated solvent between the interchanger 122 and the stripper 124 may be controlled by a valve 150.

The stripper 124 receives the volume of heated solvent ("rich" amine) and separates it into an acid gas waste stream and a volume of recycled absorption liquid solvent (a "lean" amine) The acid gas waste stream is fed through an acid gas condenser 102 for lowering its temperature prior to being fed to a reflux drum 152 where, under the power of a reflux pump 154, the acid gas waste stream is output for collection. Reflux water from the refluxing in reflux drum 152 is driven by the reflux pump 154 to feed into the stripper 124, as shown. The reflux water is combined with wash water output from the contactor 112 (under the control of valve 160) for input into the stripper 124.

The lean amine exiting the stripper 124 is fed through the interchanger 122, where it is used to heat the rich amine stream through heat exchange therewith, exiting the interchanger 122 at a lower temperature. This lean amine is pumped through a lean amine air cooler 104 (by a circulation pump 134) to further lower the temperature of the lean amine. The lean amine is then cooled even further to an appropriate temperature (approximately 52° C.) by a trim cooler 106, which uses a recirculating stream of cooling water. Following cooling by the trim cooler 106, the absorption liquid solvent (lean amine) is then fed back into the contactor 112. The stripper 124 uses low-pressure saturated steam as a heating source. Saturated steam is provided to a reboiler 136 from an external source for heat exchange with the stripper 124. The cooled steam exits the reboiler 136 as condensate C.

Conventional acid gas removal systems, such as that described above, consume large amounts of energy during the process of regenerating the rich amine to lean amine, typically on the order of 60% to 70% of the total operating cost of the system. Additionally, conventional amines used in acid gas removal have relatively low $CO_2$ loading capacities, thus requiring the use of high pressure absorber columns, high solvent circulation rates, and consequently large size contactors and strippers. The operating temperatures, pressures and size of the equipment, as well as the choice of amine, contributes to relatively high rates of equipment corrosion, and typically amines must be replaced frequently due to their degradation into organic acids. Typical amine solvents also present a problem, in that there is often co-absorption of valuable product hydrocarbon compounds, such as benzene, toluene, ethylbenzene and xylene.

Thus, an acid gas removal system for removing acidic gases from gaseous hydrocarbons solving the aforementioned problems is desired.

DISCLOSURE

The acid gas removal system for removing acidic gases from gaseous hydrocarbons removes (or "sweetens") acidic or "sour", gases, such as hydrogen sulfide ($H_2S$) and carbon dioxide ($CO_2$), from an input gaseous stream, resulting in a "sweetened" or "sweet" gas product. The acid gas removal system includes a contactor having a gas inlet, a gas outlet, an absorption liquid inlet and an absorption liquid outlet. The contactor receives a gaseous stream through the gas inlet and an absorption liquid solvent through the absorption liquid inlet. The absorption liquid solvent contacts the gaseous stream to remove acidic gases therefrom. A treated gas stream is output from the contactor through the gas outlet, and a volume of used absorption liquid solvent is output from the contactor through the absorption liquid outlet. The absorption liquid solvent is preferably methyl diethanolamine (MDEA) with a piperazine (PZ) additive.

A first heat exchanger, such as a plate-plate type heat exchanger or economizer, is in fluid communication with the contactor for receiving the volume of used absorption liquid solvent (rich amine) and heating the volume of used absorption liquid solvent to output a volume of heated solvent. A stripper is in fluid communication with the first heat exchanger for receiving the volume of heated solvent and separating the volume of heated solvent into an acidic gas waste stream and a volume of recycled absorption liquid solvent. The acidic gas waste stream is fed through the first heat exchanger for heating the volume of used absorption liquid solvent.

A second heat exchanger is in fluid communication with the stripper for receiving the volume of recycled absorption liquid solvent (lean amine) The second heat exchanger may also be a plate-plate type heat exchanger or economizer. The second heat exchanger receives a volume of water from an external source of water for cooling the volume of recycled absorption liquid solvent to form at least a portion of the absorption liquid solvent received by the contactor through the absorption liquid inlet thereof.

These and other features of the present disclosure will become readily apparent upon further review of the following specification and drawings.

BRIEF DESCRIPTION OF THE DRAWINGS

Similar reference characters denote corresponding features consistently throughout the attached drawings.

BEST MODE(S) FOR CARRYING OUT THE INVENTION

Figure 1:
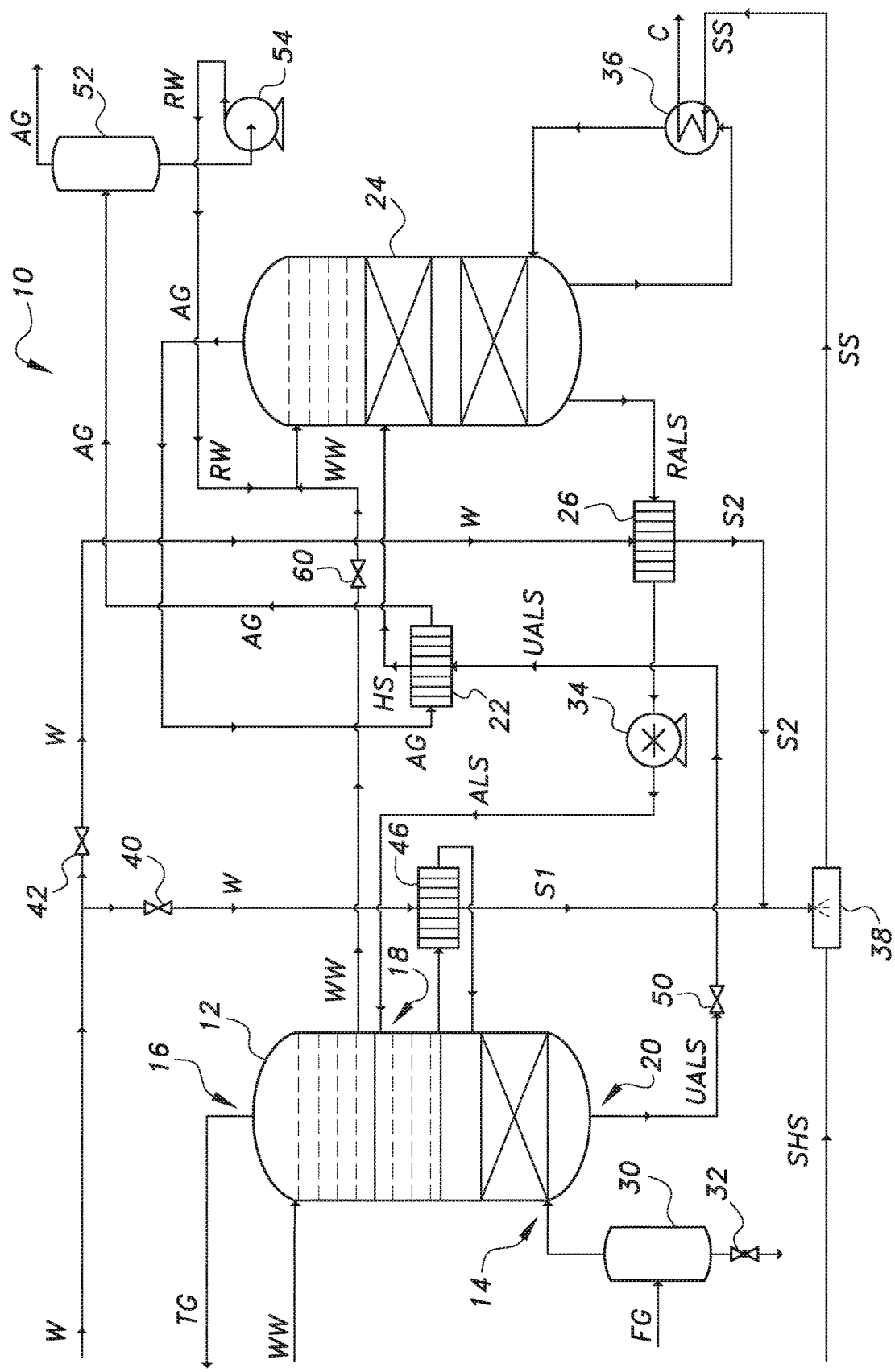
FIG. 1 is a schematic diagram of an acid gas removal system for removing acidic gases from gaseous hydrocarbons, the direction of fluid flow through conduits being shown by arrows in the lines connecting the components of the system.

FIG. 1 shows an acid gas removal system for removing acidic gases from gaseous hydrocarbons, the system being designated generally as 10. The system 10 includes a contactor 12 having a gas inlet 14 for receiving feed gas FG from a crude natural gas source, a gas outlet 16, an absorption liquid inlet 18 and an absorption liquid outlet 20. The contactor 12 receives a gaseous stream of feed gas FG through the gas inlet 14 and an absorption liquid solvent (ALS) (lean amine) through the absorption liquid inlet 18. The acidic or "sour" feed gas FG may first be fed to a knock out drum 30, where heavy hydrocarbons, droplets of water, slugs and solids are precipitated out and may be removed through valve 32.

The absorption liquid solvent (ALS) contacts the gaseous stream to remove acidic gases therefrom. A treated gas stream TG from which the acidic gas has been removed is output from the contactor 12 through the gas outlet 16. A volume of used absorption liquid solvent (UALS) (rich amine) is output from the contactor 12 through the absorption liquid outlet 20. Although it should be understood that any suitable type of absorption liquid solvent (ALS) may be used, the absorption liquid solvent (ALS) is preferably methyl diethanolamine (MDEA) with a piperazine (PZ) additive.

A first heat exchanger 22 is in fluid communication with the contactor 12 for receiving the volume of used absorption liquid solvent (UALS). The first heat exchanger 22 heats the volume of used absorption liquid solvent (UALS) to output a volume of heated solvent HS. The first heat exchanger 22 is preferably an economizer or plate-plate heat exchanger. Flow of the used absorption liquid solvent (UALS) between the contactor 12 and the first heat exchanger 22 is controlled by a valve 50.

A stripper 24 is in fluid communication with the first heat exchanger 22 for receiving the volume of heated solvent HS and separating the volume of heated solvent HS into an acidic gas waste stream AG and a volume of recycled absorption liquid solvent (RALS) (lean amine) The acidic gas waste stream AG is fed back through the first heat exchanger 22 for heating the volume of used absorption liquid solvent (UALS). The acidic gas waste stream AG may be any type of acid gas (also sometimes referred to as a "sour gas"), such as hydrogen sulfide ($H_2S$) or carbon dioxide ($CO_2$). Following heat exchange, the acidic gas waste stream AG is fed to a reflux drum 52 where, under the power of a reflux pump 54, the acidic gas waste stream AG is output for collection. Reflux water RW from the refluxing process in the reflux drum 52 is driven by the reflux pump 54 to feed into the stripper 24, as shown. The reflux water RW is combined with the wash water WW output from the contactor 12 (under the control of a valve 60) for input into the stripper 24.

A second heat exchanger 26 is in fluid communication with the stripper 24 for receiving the volume of recycled absorption liquid solvent (RALS). The second heat exchanger 26 also receives a volume of water W from an external source of water for cooling the volume of recycled absorption liquid solvent (RALS) to form at least a portion of the absorption liquid solvent (ALS) received by the contactor 12 through the absorption liquid inlet 18. The flow of water W into the second heat exchanger 26 is controlled by a valve 42. Preferably, the second heat exchanger 26 is also an economizer or plate-plate heat exchanger. As shown, the absorption liquid solvent (ALS) is fed back to the contactor by a circulation pump 34. The required concentration of the absorption liquid solvent (ALS), along with its flow rate, are selected according to the acid gas composition(s), flow rate and required quality of the treated gas TG.

The stripper 24 may use low-pressure saturated steam SS as a heating source. Saturated steam SS is provided to a reboiler 36 for heat exchange with the stripper 24, i.e., the reboiler 36 heats the heated absorption liquid solvent to reverse the absorption process so that the acidic gases can be stripped from the absorption liquid solvent by steam in the stripper 24. Steam cooled in the process exits the reboiler 36 as condensate C. As shown, superheated steam (SHS) from an external source may be provided to a de-superheater 38, which converts the superheated steam (SHS) into saturated steam SS. A reverse pump 46 provides heat exchange between a diverted portion of water W (with flow controlled by a valve 40) and the absorption liquid solvent from the contactor 12, reducing the temperature of the absorption liquid solvent returned to the contactor 12 and producing a first stream of steam 51 from the water W. The heat exchange between water W and the recycled absorption liquid solvent (RALS) in the second heat exchanger 26 results in a second stream of steam S2, and both streams 51 and S2 are fed to de-superheater 38 for converting the superheated steam (SHS) into saturated steam SS.

For an initial temperature of feed gas FG of 35° C., the output temperature from the contactor 12 feeding into the reverse pump 46 is approximately 106° C. Following heat transfer with water W in the reverse pump 46, the input temperature back into the contactor 12 is approximately 70° C. Due to this heat transfer, for a temperature of water W feeding into reverse pump 46 of 41° C., the temperature of steam 51 feeding into de-superheater 38 is approximately 101° C. Similarly, for 41° C. water W feeding into the second heat exchanger 26, the temperature of steam S2 feeding into de-superheater 38 is also approximately 101° C. This allows the re-circulating feed through the reboiler 36 to have a temperature of approximately 123° C. and, similarly, for the recycled absorption liquid solvent (RALS) being output from the stripper 24 to also have a temperature of approximately 123° C.

Figure 2:
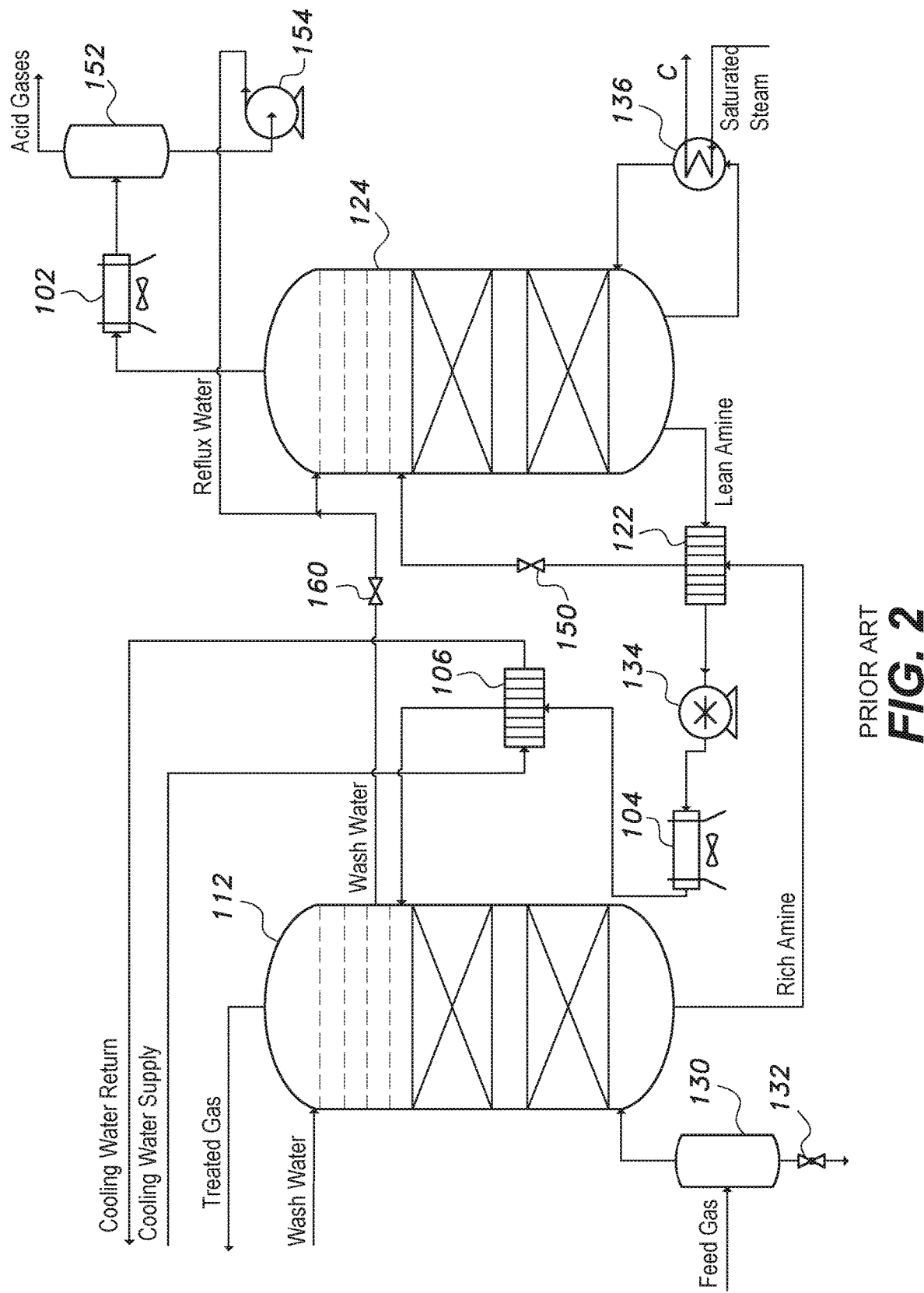
FIG. 2 is a schematic diagram of an acid gas removal system of the prior art.

In a conventional prior art acid gas removal system, such as system 100, described above with reference to FIG. 2, the amine absorption liquid solvent exiting the stripper 124 is typically fed through an interchanger 122, as described above, rather than being fed through the second heat exchanger 26 of the present system 10. In the conventional prior art acid gas removal system 100, the amine absorption liquid solvent exiting the interchanger 122 typically has a temperature of approximately 84° C. and then must pass through a separate amine air cooler 104 to lower its temperature to approximately 57° C., and then further be passed through an additional trim cooler 106 to further lower the temperature to approximately 52° C. before being injected into the contactor 112. In the present acid gas removal system 10, the additional coolers are not necessary, since the absorption liquid solvent (ALS) exiting second heat exchanger 26 has a temperature of approximately 51° C., and after passing through the circulation pump 34, has a temperature of approximately 52° C. before being injected directly into the contactor 12. Conventional trim cooler 106 further requires a separate stream of cooling water (with a temperature of approximately 32° C.) as well as the equipment necessary to circulate this water following the heat exchange (typically with a final temperature of approximately 41° C.).

Additionally, due to the heat exchange from the reverse pump 46, as described above, the used absorption liquid solvent (UALS) exiting the contactor 12 has a temperature of approximately 45° C., whereas the corresponding UALS of the conventional prior art acid gas removal system 100 has a temperature of approximately 58° C. exiting the contactor 112. Correspondingly, the treated gas TG exiting the contactor 12 in the present system 10 will have a temperature of approximately 61° C., whereas the corresponding treated gas of the conventional prior art acid gas removal system 100 will have a temperature of approximately 52° C.

As noted above, the conventional prior art acid gas removal system 100 uses an interchanger 122 for heat exchange between the RALS exiting the stripper 124 and the used absorption liquid solvent (UALS) exiting the contactor 112. In the conventional prior art system 100, the UALS is typically heated from approximately 58° C. to approximately 100° C. by the interchanger 122. The heated UALS is then cooled slightly to approximately 93° C. before being input to the stripper 124. However, as described above, in the acid gas removal system 10, the UALS is heated by the first heat exchanger 22, which raises the temperature of the UALS from approximately 45° C. to approximately 105° C. before being input to the stripper 24.

The acid gas in both the conventional prior art acid gas removal system 100 and the acid gas removal system 10 exits the stripper with a temperature of approximately 110° C. However, in the present system 10, the acid gas AG is circulated through the first heat exchanger 22 for heat exchange with the UALS. This heat exchange lowers the temperature of the acid gas AG to a temperature of approximately 57° C. for refluxing and disposal. In the conventional prior art acid gas removal system 100, however, acid gas is typically routed directly to the reflux drum 152 and must pass through an additional acid gas condenser 102 to lower its temperature. The present system 10 makes this further piece of additional equipment unnecessary.

Additionally, as noted above, the present system 10 preferably uses methyl diethanolamine (MDEA) with a piperazine (PZ) additive as the absorption liquid solvent. This allows for enhanced $CO_2$ loading in the amine. Combining this with the above temperature differences (and corresponding differences in pressure), the present system 10, when compared against conventional prior art system 100, enhances both carbon dioxide and acid gas loading by approximately 62%.

Further, for saturated steam entering the reboiler 36, in either system, the saturated steam must have a temperature of approximately 152° C., a pressure of approximately 5.02 bars, a specific energy of approximately 2,748.81 kJ/kg, a flow rate of approximately 62,247 kg/hour, and a velocity of approximately 15 m/sec. The conventional prior art system 100 is required to generate saturated steam to meet these requirements, thus expending a large amount of energy simply to produce the required saturated steam. In contrast, the present system 10 recycles superheated steam (SHS) (which is already being produced in the plant) and adds this superheated steam (SHS) to streams S1 and S2, which are generated, respectively, by the reverse pump 46 and the second heat exchanger 26. Streams S1 and S2 already each have a temperature of approximately 101° C., with a pressure of approximately 1.05 bars, a specific energy of approximately 2,254.02 kJ/kg, a flow velocity of approximately 15 m/sec and a flow rate of approximately 39,337.5 kg/hour. Thus, the amount of saturated steam generation required in the present system 10 is approximately 62.5% less than that of the conventional prior art system 100, thus reducing regeneration energy consumption.

Figure 3:
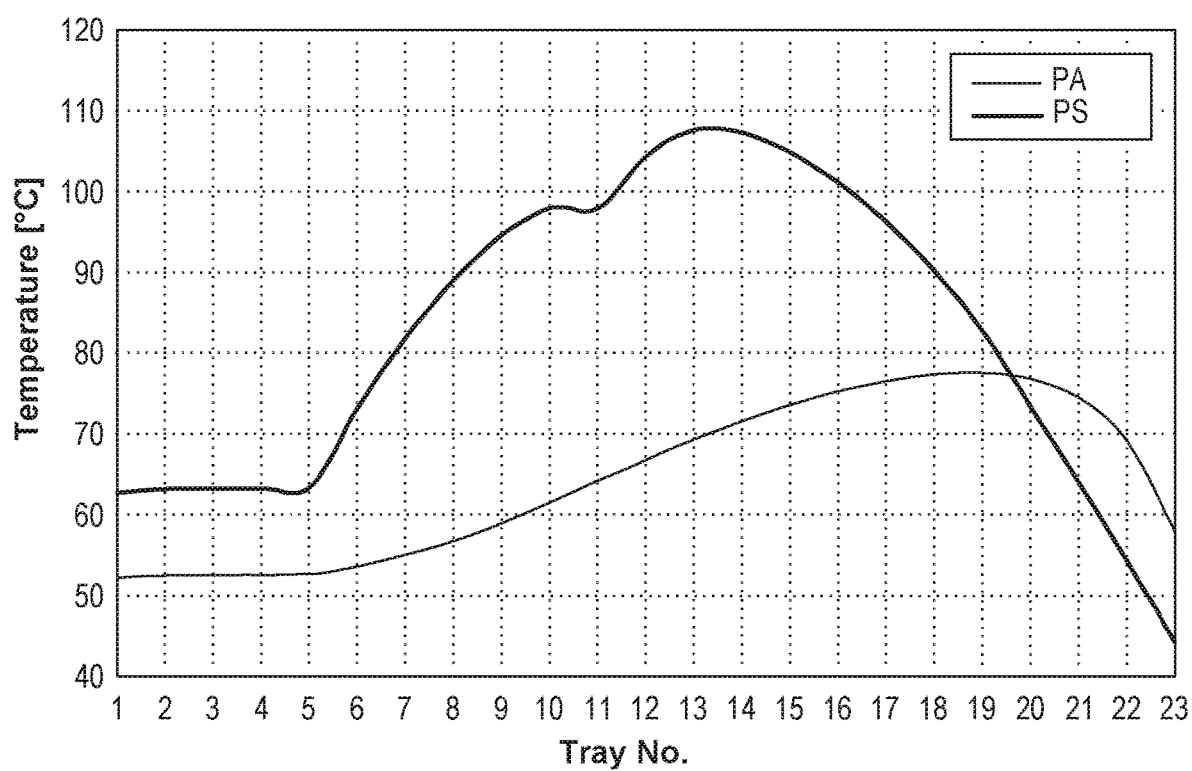
FIG. 3 is graph comparing the temperature profiles of multi-tray contactors in the acid gas removal system of FIG. 1 (trace PS) with the acid gas removal system of FIG. 2 (trace PA).
Figure 4:
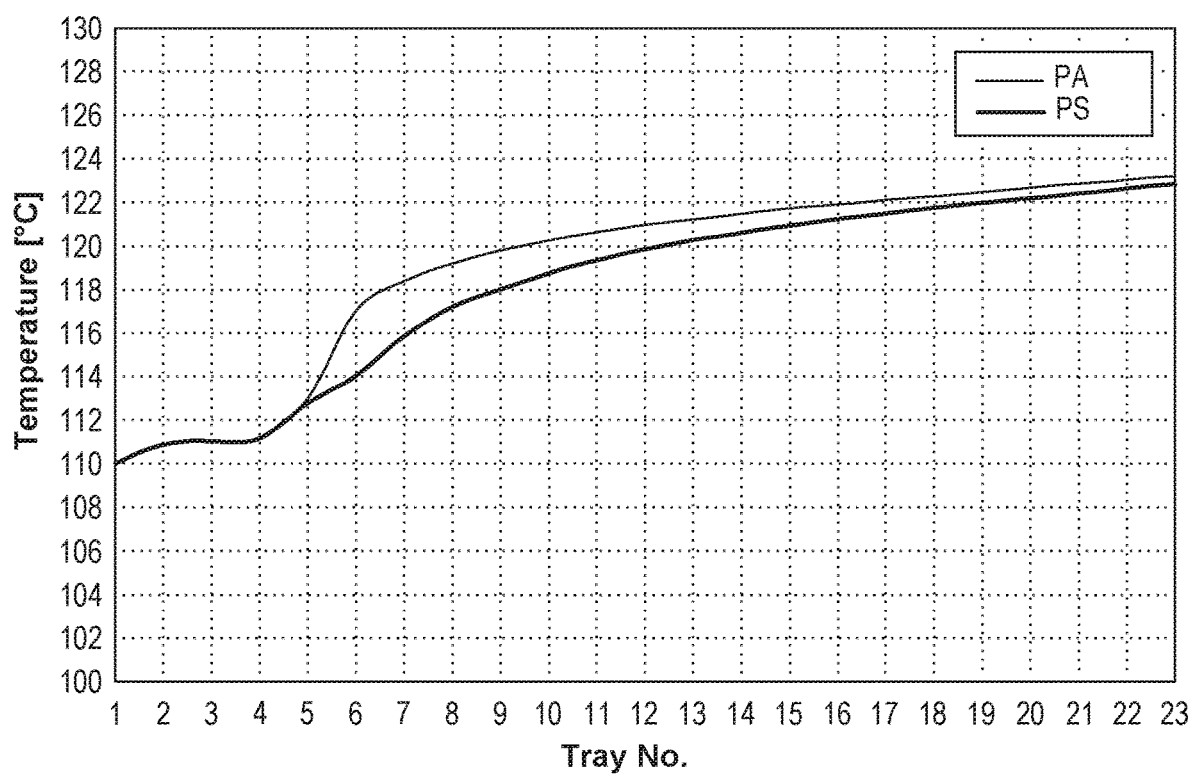
FIG. 4 is graph comparing the temperature profiles of multi-tray strippers in the acid gas removal system of FIG. 1 (trace PS) with the acid gas removal system of FIG. 2 (trace PA).

Further, the present system 10 reduces the required solvent rate by approximately 38%, reduces pumping power by 45%, and eliminates the need for an additional cooling water stream. This comparison between the present system (PS) 10 and the conventional prior art (PA) system 100 is further elaborated in Tables 1 and 2 below. The graph shown in FIG. 3 compares the temperature profiles in multi-tray contactors for both the present system (PS) 10 and the conventional prior art (PA) system 100. Similarly, the graph of FIG. 4 compares the temperature profiles in conventional multi-tray strippers for both the present system (PS) 10 and the conventional prior art (PA) system 100.

TABLE 1

Comparison Between the Present System (PS) and the Prior Art (PA) System

| System | Solvent | Sweet Gas Quality $CO_2$ (mole %) | $H_2S$ (ppm) | Acid Gas Loading | Circulation Rate (m³/hr) | Strength (wt %) |
|---|---|---|---|---|---|---|
| PS | MDEA/PZ | 0.074 | 2.239 | 0.4799 | 522.6 | 29/1 |
| PA | MDEA/PZ | 0.00050 | 4.0 | 0.780 | 336.6 | 13/17 |

TABLE 2

Comparison Between the Present System (PS) and the Prior Art (PA) System

| System | Pumping Power (KW) Circulation Pump | Reflux Pump | Air Coolers Duty (KWth) Lean Amine | Acid Gas Condenser | Utilities Reboiler Steam (tons/hour) | Cooling Water (ton/hour) |
|---|---|---|---|---|---|---|
| PS | 1085.0 | 0.7941 | 14,531 | 24,433 | 80.1 | 268.2 |
| PA | 579.1 | 0.7912 | 0 | 0 | 29.99 | 0.0 |

It is to be understood that the acid gas removal system for removing acidic gases from gaseous hydrocarbons is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An acid gas removal system for removing acidic gases from gaseous hydrocarbons, the system comprising:
   an absorption liquid solvent capable of removing acidic gases from gaseous hydrocarbons;
   a contactor having:
      a gas inlet adapted for receiving a stream of the gaseous hydrocarbons containing the gaseous hydrocarbons;
      a gas outlet adapted for providing an outlet for the gaseous hydrocarbons after removal of the acidic gases therefrom, the gaseous hydrocarbons being contacted by the absorption liquid solvent and the acidic gases being removed therefrom by absorption into the absorption liquid solvent inside the contactor;
      an absorption liquid inlet for introducing the absorption liquid solvent into the contactor; and
      an absorption liquid outlet for removing used absorption liquid solvent having the acidic gases absorbed therein from the contactor;
   a stripper for stripping the acidic gases from the used absorption liquid solvent and recovering recycled absorption liquid solvent from the used absorption liquid solvent;
   a first heat exchanger in fluid communication with the contactor, the first heat exchanger being configured for receiving the used absorption liquid solvent, for heating the used absorption liquid solvent by heat exchange with a hot fluid to form a heated solvent, and for outputting the heated solvent to the stripper for removal of the acidic gases therefrom;
   a second heat exchanger in fluid communication with the stripper, the second heat exchanger being configured for receiving the recycled absorption liquid solvent, for cooling the recycled absorption liquid solvent by heat exchange with a cold fluid, and for outputting the recycled absorption liquid solvent to the absorption liquid inlet of the contactor; and
   a reverse pump in fluid communication with the contactor, the reverse pump being connected for removing hot fluids from the contactor, for heating water from an external source to produce a first stream of steam by heat exchange with the hot fluids, and for returning the hot fluids to the contactor after heat exchange.

2. The acid gas removal system as recited in claim 1, wherein the first heat exchanger comprises a plate-plate heat exchanger.

3. The acid gas removal system as recited in claim 2, wherein the second heat exchanger comprises a plate-plate heat exchanger.

4. The acid gas removal system as recited in claim 1, wherein said absorption liquid solvent comprises methyl diethanolamine (MDEA) and a piperazine (PZ) additive.

5. The acid gas removal system as recited in claim 1, wherein the cold fluid used to cool the recycled absorption liquid solvent in the second heat exchanger comprises water, the water being heated during the heat exchange to generate a second stream of steam.

6. The acid gas removal system as recited in claim 5, further comprising a de-superheater connected for receiving the first and second streams of steam and for receiving superheated steam from an external source, the de-superheater for converting the superheated steam into a stream of saturated steam using the first and second streams of steam.

7. The acid gas removal system as recited in claim 6, further comprising a reboiler connected to the stripper and connected for receiving the stream of saturated steam from the de-superheater for heating the heated solvent for stripping acidic gases from the heated solvent in the stripper.

8. The acid gas removal system as recited in claim 1, further comprising a reflux drum in fluid communication with the first heat exchanger for receiving the acidic gas waste stream from the first heat exchanger for reflux thereof.

9. The acid gas removal system as recited in claim 1, further comprising a knock out drum connected to the gas inlet of the contactor for removing solid and liquid impurities from the stream of gaseous hydrocarbons.

* * * * *